United States Patent [19]

Bone et al.

[11] 4,235,935

[45] Nov. 25, 1980

[54] PROCESS FOR THE PRODUCTION OF A BACON ANALOGUE

[75] Inventors: David P. Bone, Palantine; Robert J. Meschewski, East Dundee, both of Ill.

[73] Assignee: The Quaker Oats Company, Chicago, Ill.

[21] Appl. No.: 880,449

[22] Filed: Feb. 23, 1978

[51] Int. Cl.$^3$ .......................... A23J 3/00; A23L 1/27
[52] U.S. Cl. .................................. 426/249; 426/516; 426/602; 426/656; 426/657; 426/802
[58] Field of Search ............... 426/104, 249, 250, 602, 426/605, 656, 657, 516, 802, 274, 311, 517

[56] References Cited

U.S. PATENT DOCUMENTS

| | | | |
|---|---|---|---|
| 3,416,931 | 12/1968 | Posegate | 426/249 |
| 3,840,677 | 10/1974 | Leidy et al. | 426/802 X |
| 3,930,033 | 12/1975 | Corliss et al. | 426/802 X |
| 3,999,474 | 12/1976 | Sienkiewicz et al. | 426/802 X |
| 4,029,823 | 6/1977 | Bone et al. | 426/249 |
| 4,061,789 | 12/1977 | Warren | 426/802 X |
| 4,104,415 | 8/1978 | Shanbhag et al. | 426/657 X |
| 4,166,138 | 8/1979 | Ziminski et al. | 426/802 X |

*Primary Examiner*—Arthur L. Corbin
*Attorney, Agent, or Firm*—Charles J. Hunter

[57] ABSTRACT

A method and apparatus is described for producing a continuous strip of simulated bacon by low temperature extrusion of three differently colored doughs to form a common strip containing three or more distinctly different colored zones which are continuously and randomly varied in width. Differences in extrusion rates among the doughs may be used to impart crinkling and curling of the strip which is heat treated after extrusion, thereby setting the structure and preserving the crinkling and curling. The strip contains an emulsion which is designed to be stable during processing, and during storage, but which is unstable during cooking. During frying or baking the emulsion becomes unstable, thereby rendering out oil upon the cooking surface, making it unnecessary to add oil, grease, or frying aids during cooking, and thereby closely simulating the cooking attributes of real bacon.

11 Claims, No Drawings

PROCESS FOR THE PRODUCTION OF A BACON ANALOGUE

BACKGROUND OF THE INVENTION

1. Field of the Invention

This invention relates to meat-like products having distinct lean and fatty appearing regions and the method of preparing them, and more particularly to a simulated bacon product having a fried appearance and texture resembling fried bacon.

2. Description of the Prior Art

Currently, there exists no method for producing a simulated sliced bacon product that simultaneously contains the features of bacon-like marbling, crinkling, self-basting, and which is made by a continuous extrusion process.

U.S. Pat. No. 3,840,677 teaches a method of preparing a simulated bacon wherein marbling is obtained by layering low viscosity emulsions, and a method of crinkling, but does not teach a method of producing a self-basting product, or a method of continuous extrusion processing.

U.S. Pat. No. 3,658,550 teaches a method for preparing a simulated bacon wherein marbling is obtained by layering calcium alginate based gels, and a method of producing a self-basting product, but does not teach a method of crinkling, or a method of continuous extrusion processing.

U.S. Pat. No. 3,320,070 teaches three methods of marbling dough-like preparations of simulated bacon but does not teach a method of crinkling, a method of producing a self-basting product, or a method of continuous extrusion processing.

U.S. Pat. No. 3,930,033 teaches a method of preparing simulated bacon whereby marbling is obtained by layering aerated doughs but does not teach a method of crinkling, a method of producing a self-basting product, or a method of continuous extrusion processing.

There is no obvious way to combine the teachings of these various U.S. Patents into a consolidated method whereby all the features are contained in a single simulated bacon product. Further, there is no obvious method of combining the teachings of the various patents to simulate bacon made by a continuous extrusion process. For these reasons, there is a need for a method of continuous extrusion processing a simulated bacon product that contains bacon-like marbling, crinkling, and which is self-basting upon cooking.

The present invention is considered to be a further development in the field of proteinaceous materials resembling meat products. This invention is considered a significant advance in bacon analogues wherein essential characteristics, including texture, appearance, chewiness, taste, and cooking properties of the meat counterpart are duplicated.

SUMMARY OF THE INVENTION

It is, therefore, an object of the present invention to provide a method to produce a simulated bacon product by a continuous extrusion process.

It is another object of this invention to provide a simulated bacon slice that is marbled in a manner similar to natural bacon.

It is a further object of this invention to provide a simulated bacon slice which is normally fried or cooked in the same manner as real bacon, without the need of frying or cooking aids such as oils or fats.

It is a still further object of this invention to provide a simulated bacon slice having crinkling, curling, twisting, and folding that is analogous to fried bacon.

It is yet a further object of this invention to provide a simulated bacon slice having a variable width that is analogous to natural sliced bacon.

Another object of this invention is to provide a continuous process for forming a simulated bacon slice containing up to four distinct stripes or color zones.

Another object of this invention is to provide a simulated bacon slice which upon frying or cooking contains a distinct texture contrast between the simulated lean and simulated fat portions that is analogous to the corresponding texture of fried or cooked natural bacon.

Another object of this invention is to provide an apparatus for continuous processing of simulated bacon slices.

DETAILED DESCRIPTION OF THE INVENTION

These and other objects of this invention are accomplished by formulations and a process for the production of a bacon analogue resembling natural bacon in appearance, cooking characteristics, flavor, eating qualities, and texture, said process comprising:

a. preparing a first mass by admixing heat setting protein, a protein additive, oil or fat, starch, protein fibers, flavoring agents, vitamins, vegetable gums, salt, water, and coloring agents to simulate the flavor, color and appearance of the dark red lean portion of natural bacon;

b. preparing a second mass by admixing heat setting protein, a protein additive, oil or fat, starch, protein fibers, flavoring agents, vitamins, vegetable gums, salt, water, and coloring agents to simulate the flavor, color, and appearance of the light red lean portion of natural bacon;

c. preparing a third mass by admixing heat setting protein, a protein additive, oil or fat, starch, protein fibers, flavoring agents, vitamins, vegetable gums, salt, water, and coloring agents to simulate the flavor, color, and appearance of the fatty tissue of natural bacon;

d. simultaneously and separately extruding, at room temperature, each of the first, second, and third masses through a common die to form a single common strip that is marbled like bacon whereby the common strip is composed of alternating substrips of the first, second, and third masses, such that an outer border substrip of the first mass is adjacent and parallel to a next substrip of second mass which is adjacent and parallel to a substrip of the third mass which is adjacent and parallel to a second outer border substrip of the second mass wherein all four substrips are oriented in parallel fashion to each other and to the longitudinal axis of the extruded continuous strip.

e. heat treating the simulated marbled bacon strip; and f. cutting the simulated marbled bacon continuous strip to simulate bacon slices.

The objects of this invention can also be accomplished by a process for the production of a bacon analogue having self-basting characteristics, resembling natural bacon in appearance, cooking characteristics, flavor, eating qualities, and texture, said process comprising:

a. preparing a first emulsion system to simulate the dark red lean portion of natural bacon, by admixing from 2-7 percent by weight heat setting protein, from 0-5 percent by weight of a protein additive, from 0.5-4 percent by weight starch, from 0.5-6 percent by weight vegetable gum, vitamins, coloring agents, flavoring agents, from 0.4-1.5 percent by weight surfactant, from 15-30 percent by weight water, and from 4-18 percent by weight oil or fat;

b. preparing a first emulsion system to simulate the light red lean portion of natural bacon by admixing from 2-7 percent by weight heat setting protein, from 0-5 percent by weight of a protein additive, from 0.5-4 percent by weight starch, from 0.5-6 percent by weight vegetable gum, vitamins, coloring agents, flavoring agents, from 0.4-1.5 percent by weight surfactant, from 15-30 percent by weight water, and from 4-18 percent by weight oil or fat;

c. preparing a first emulsion system to simulate the fatty portion of natural bacon, by admixing from 2-7 percent by weight heat setting protein, from 0-5 percent by weight of a protein additive, from 0.5-4 percent by weight starch, from 0.5-6 percent by weight vegetable gum, vitamins, coloring agents, flavoring agents, from 0.4-1.5 percent by weight surfactant, from 15-30 percent by weight water and from 4-18 percent by weight oil or fat;

d. preparing a second emulsion system by admixing from 0.1 to 1.0 percent by weight of a protein additive, flavoring agents, 0.05-1 percent by weight vegetable gums, from 5-15 percent by weight water, and from 5-15 percent by weight oil or fat;

e. separately admixing the second emulsion system with each of the three differently colored first emulsion systems to produce a separate and distinct first dough, a separate and distinct second dough, and a separate and distinct third dough, said first dough resembling the dark red lean portion of natural bacon, said second dough resembling the light red lean portion of natural bacon, said third dough resembling the fatty portion of natural bacon;

f. admixing from 15-30 percent by weight of protein fibers with each of the first, second, and third doughs, said protein fibers ranging in length from 0.6-5 centimeters;

g. simultaneously and separately extruding each of the first, second, and third doughs through a common die to form a single strip that is marbled like bacon whereby the single strip is composed of alternating substrips of the first, second, and third doughs, such that a first outer border substrip, of the first dough, is adjacent and generally parallel to a next substrip of the second dough which is adjacent and generally parallel to a substrip of the third dough which is adjacent and generally parallel to a second outer border substrip, of the second dough, wherein all four substrips are oriented in parallel fashion to each other and to the longitudinal axis of the extruded single strip;

h. heating the single common strip which resembles marbled bacon; and i. cutting the single common strip to simulate bacon slices.

Crinkling and/or curling and/or twisting and/or folding of the single continuous common strip of simulated bacon can be achieved by extruding one or more of the different masses or substrips at different rates. In this process the resulting combined or common strip is heated, thereby setting the structure and preserving the crinkling, curling, twisting, and folding.

Crinkling and/or curling and/or twisting and/or folding can also be achieved by varying the width of the substrips before they are combined to form a common strip, thereby imparting a realistic bacon-like marbling or orientation of the simulated lean-fatty substrips.

The present invention can also be practiced by a process wherein the thickness of the continuous common strip of simulated bacon can be varied continuously during extrusion by varying the height of the vertical aperture of the extrusion die, thereby imparting variations in strip thickness in a manner similar to natural bacon. Preferably, the variation in strip thickness will be in the range of 0.030" to 0.090".

The present invention can also be practiced by a process wherein the single strip has dimensions similar to a slice of bacon or alternatively, similar to a slab of bacon. The invention can also be practiced by a process wherein each of the first, second and third masses are extruded at a temperature in the range of 32° F. to 140° F., or alternatively in the range of 40° F. to 100° F., or alternatively in the range of 60° F. to 80° F.

The present invention can also be practiced by a process wherein the ratio of the first emulsion system to the second emulsion system (paragraph e. above) is within the range of 1:1 to 3.5:1 or alternatively within the range of 1:1 to 2.6:1. The present invention can also be practiced by a process wherein the second emulsion system contains from 0.05 to 1.0 percent by weight vegetable gum, from 0.1 to 1.0 percent by weight protein additive, from 5 to 15 percent by weight water, and from 5 to 15 percent by weight oil or fat, and flavoring agents.

The simulated bacon strip contains an emulsion system which is designed to be stable during processing, and during storage, but which is unstable during cooking. During frying or baking the emulsion system becomes unstable, thereby rendering out oil upon the cooking surface, making it unnecessary to add oil, grease, or frying aids during cooking, and thereby closely simulating the cooking properties and self-basting properties of real bacon. The emulsion system is produced by admixing a first emulsion with a second emulsion whereby the first emulsion differs in composition and properties from the second emulsion. The first emulsion contains a surfactant having an HLB value in the range 1 to 20 preferably 14.9. The second emulsion contains a mixture of guar and locust bean gums. The ratio of guar gum to locust bean gums is in the range of 99:1 to 1:99. The preferred ratio of guar gum to locust bean gum is 50:50.

As stated above, the simulated bacon strip is heat treated after extrusion. The heat treatment can be performed in any conventional manner. Preferably, the simulated bacon is heat treated in a microwave oven in order to maximize appearance, flavor, and texture. It is also preferable to heat the simulated bacon strip to a temperature between 150° to about 190° F., and for a time between 20 to about 50 seconds.

The heat setting protein acts primarily as a binder in the practice of the present invention, and also acts as a source of nutritional protein. As a binder, the heat-setting protein acts in two ways. First, the heat-setting protein acts as a binder to cement the substrips together in forming a common extruded strip during room temperature extrusion. If the amount of heat-setting protein is too low the strips will separate at the junctures between the substrips, resulting in failure to form a common strip. Second, the heat-setting protein acts as a binder in the heat processed simulated bacon strip. If the amount of heat setting protein is too low the structure of the processed product will be too weak and fragile and the strips will tend to break easily during processing and/or cooking. If the amount of heat setting protein is too high, the fried product will tend to be too tough and rubbery in texture. We have found, in accordance with these considerations, that the amount of heat setting protein should be from about 2 to about 7 percent by weight of the final product, with a preferred amount of from 3 to about 5 percent. I have also found that the preferred heat setting protein is egg albumen. Other heat setting proteins may be selected from the group consisting of soybean oil meal, soybean flour, soy protein concentrate, soy protein isolates, yeast, cottonseed meal, cottonseed flour, cottonseed protein isolate, peanut meal, peanut flour, peanut protein isolate, corn germ, corn germ meal, wheat germ, wheat germ meal and wheat gluten.

The protein additive acts primarily to provide the incremental amount of nutritional protein required towards meeting legal and nutritional requirements in the simulated bacon product. Examples of suitable protein additives for use in this invention are soy protein isolates, soy proteinates, peanut protein isolate, peanut proteinates, cottonseed protein isolates, and cottonseed proteinates. The preferred protein additive for use in this invention is soy proteinate. The amount of protein additive should be from 0 to 5 percent by weight, with the preferred amount being from about 2 to about 4 percent by weight.

The oil or fat suitable for use in this invention is preferably corn oil, but other commercially available oils or fats, such as rendered fried bacon fat, lard, cottonseed oil, safflower oil, coconut oil, or peanut oil can also be used. I have found in accordance with the present invention that the amount of oil or fat should be from about 15 to about 35 percent by weight of the final product, with a preferred amount of from about 25 to 30 percent. If the level of oil or fat is too low, the product may burn when fried unless oil is added to the griddle. If the level of oil or fat is too high, the substrips may not bind together to form a common marbled strip during extrusion and/or the processed strip may be too fragile. Corn oil is preferred in this invention because of its bland flavor, light color, stability, and its polyunsaturated fat content.

The vegetable gums used in this invention are employed as texturizing and emulsifying agents. For texturizing a first emulsion, previously described, vegetable gum is used at a level of from about 1 to about 6 percent by weight of the final product with a preferred amount of from about 2 to about 3 percent. If the level of vegetable gum is too low or too high, the final dough mass may lack proper viscosity or rheological properties to be useful in continuous extrusion. If the viscosity of the dough is too low, or the dough flows too readily, the resulting strip may be too thin, fragile, and be resistant to crinkling. If the viscosity of the dough is too high, or the dough flows with too much resistance, the resulting strip may be too thick, resulting in a tough fried texture. For texturizing, the vegetable gum preferred in this invention is guar gum, but other vegetable gums may be used such as seaweed extract, carrageenan, locust bean gum, or methyl cellulose, as partial or complete substitutes for guar gum according to the purview of those skilled in the art.

For use in preparing a second emulsion, as previously described, a combination of guar gum and locust bean gum is used.

The starch used in this invention acts primarily as a binder and viscosity builder in the raw dough mass and as a texturizing agent in the fried or cooked product. For use as a binder in the raw dough it is preferable to use a pregelatinized starch which typically becomes adhesive when wet, and which aids in cementing the substrips together in forming a common marbled strip during extrusion. If the level of starch is too low the substrips will not adhere sufficiently to one another and will not form an acceptable common strip. If the starch level is too high the raw dough may become unduly sticky and difficult to handle. For use as a viscosity builder in the raw dough mass it is also preferable to use pregelatinized starch according to common practice of those skilled in the art. If the level of starch is either too low or too high the dough may be either too flowable or lack flowability, respectively, for acceptable extrusion processing. As a texturizing agent, either common starch or pregelatinized starch or a combination of these may be used. If the level of starch is too low, the fried or cooked product lacks desired bacon-like crispness. If the level of starch is too high, the fried or cooked product is typically too tough, or too hard, depending upon the extent of frying or cooking. In accordance with these considerations, and for the purposes of this invention, a pregelatinized starch may be derived from wheat, corn, rice, potato, tapioca, or other source of edible starch. The amount of starch must be from about ½ to about 4 percent by weight of the final product, with a preferred amount of about 1 to 2 percent.

The surfactant employed in this invention acts primarily to provide an oil in water first emulsion, as described previously. The emulsion, in turn, acts primarily as a viscosity builder, and as an adhesion builder in the raw dough, and as a texturizing agent in the fried or cooked product, and as a part of the self-basting system in the final fried or cooked product. If the level of surfactant is too low, the first emulsion system will not be stable during processing and will typically render out oil during mixing, resulting in an oily, non-homogenous dough that will not form an adhesive substrip in extrusion of a common strip, as previously described. Further, the texture of the first emulsion system, should the level of surfactant be too low, is typically grainy and discontinuous rather than smooth and cohesive and meat-like, as desired. Further, if the level of surfactant is too low, the viscosity of the first emulsion will be too low for proper extrusion. If the level of surfactant is too high the self-basting feature in the fried or cooked product will be reduced and an undesirable flavor that is characteristic of surfactants will become detectable. Still further, if the level of surfactant is too low the ratio of crispness to chewiness of the fried or cooked product will be out of desired balance and the product will typically be too chewy to simulate bacon. In accordance with these considerations I have found, for this invention, that the level of surfactant should be from about 0.4 to about 1.5 percent of the weight of the final product, with a preferred amount of 0.6 to 0.8 percent.

A further requirement of the surfactant is that it have an HLB value in the range 1 to 20 HLB. However, better results are achieved in this invention when the HLB value is in the range 8 to 15 HLB. The preferred HLB range for this invention is 12 to 15 HLB.

The HLB value is within the purview of those skilled in the art. The HLB system is based on the fact that each surfactant has hydrophilic and lipophilic groups in the same molecule. The HLB value of the surfactant is an indication of the balance of the size and strength of these groups. Most food surfactants are nonionic in character. For these, the HLB number is an indication of the percentage weight of the hydrophilic portion of the molecule divided by 5 to give smaller numbers to handle. The HLB range of nonionic surfactants is then from >0 to <20. Lipophilic surfactants have low HLB numbers (less than 9) and hydrophilic surfactants are assigned high HLB values (above 11). Those in the range of 9 to 11 are intermediate, having an equal affinity for oil and water.

In this invention, if the HLB value of the surfactant is too low, the aforementioned first emulsion system will not be stable during processing and will render out oil, resulting in an oily, non-adhesive dough whereby cementing of the substrips to form a common substrip will not occur. Further, the texture of the first emulsion system will typically be grainy and discontinuous rather than smooth, cohesive and meat-like, and will typically lack the viscosity or body needed to promote acceptable handling and extrusion. Further, the texture of the fried or cooked product is also dependent upon the HLB level of the surfactant. If the HLB level is too low the final cooked or fried product will typically have a grainy, chewy texture, and lack the smooth, crispy texture of bacon.

One of the most important surfactant functions is emulsification. An emulsion is an intimate mixture of two immiscible liquids, one of which is dispersed as finite globules in the other. The liquid divided into globules is known as the disperse, discontinuous, or internal phase of the emulsion. The surrounding liquid is called the non-disperse, continuous, or external phase. If the oil is the internal phase, and water the external phase, the emulsion is called an oil-in-water (O/W) type. When water is the internal phase, with oil as the external phase, the emulsion is categorized as a water-in-oil (W/O) type. The first and second emulsions referred to above are both of the oil and water type emulsion.

The protein fibers used in this invention act primarily to control dough viscosities, extrusion properties, and to simulate the fibrous structure of meat in the product. The amount of protein fibers should be from about 15 to about 30 percent by weight of the final product, with a preferred amount of about 18 to 27 percent. For this invention, if the level of protein fibers is too low, dough viscosities will be too low, resulting in impaired extrusion, plugging of the extrusion die, production of weak, thin strips, impaired crinkling, and a texture of the product that is less meat-like. If the level of protein fibers is too high, the viscosity of the dough will be too high, resulting in impaired extrusion due to increased resistance, production of strips that are too thick, and a final product that is too tough in texture with respect to simulation of bacon. The protein fibers can consist of lengths in the range from about 0.6 centimeters to about 5 centimeters, with a preferred length from about 1.3 to about 2.5 centimeters. If the protein fibers are too short the dough viscosities will be reduced to an insufficient value, extrusion will be impaired, crinkling will be reduced, the strips will typically be too thin and weak, and the texture of the final product will be less meat-like. If the protein fibers are too long the dough viscosities will be increased to an undesirable value, extrusion will be impaired due to increased resistance, the strips will be too thick, and the end product texture will be less bacon-like.

The protein fibers used in this invention may be derived from vegetable protein such as spun or extruded soy, cottonseed, peanut, or sesame seed protein or may be derived from spun or ground animal protein such as collagen.

For this invention, texture contrast between the simulated lean and simulated fatty bacon tissue is obtained by providing differences in the levels of texturizing ingredients such as vegetable gum, protein fibers, and emulsion system, as shown by example. For this purpose sorbitol and glycerine may be optionally used alone or in combination. For this invention sorbitol is preferred as an optional ingredient in the red colored doughs only at a use level up to 10 percent of the weight of the dough, and a preferred maximum of about 6 percent. Used in this manner, sorbitol acts primarily to reduce crispiness of the lean simulated bacon portion whereas the simulated fatty simulated bacon portion remains crisp, thereby enhancing textural contrast.

For this invention, colorants may consist of a wide variety of allowable food coloring materials such as FD&C Red 40, FD&C Red 3, FD&C food dyes, caramel coloring, and plant and animal colorants.

The following examples are offered to illustrate but not limit the process and product of this invention. Unless stated to the contrary, all percentages are given by weight.

EXAMPLE I

In accordance with the invention, a simulated bacon which incorporates the features of bacon-like marbling, crinkling, and self-basting, was prepared by a continuous extrusion process according to the following formula and method:

TABLE I

|  |  | Dark Red Lean | Light Red Lean | Fatty |
|---|---|---|---|---|
| (F1) | Egg Albumen | 3.0 | 3.0 | 3.0 |
| (F1) | Soy Proteinate | 4.0 | 4.0 | 4.0 |
| (F1) | Pregelatinized Tapioca Starch | 2.0 | 2.0 | 2.0 |
| (F1) | Guar Gum | 2.0 | 2.0 | 2.5 |
| (F1) | Colorants | 0.164 | 0.082 | 0.001 |
| (F1) | Vitamin Premix | 0.04 | 0.04 | 0.04 |
| (F2) | Water | 22.796 | 22.878 | 23.084 |
| (F2) | Caramel Color | — | — | 0.025 |
| (F3) | Corn Oil | 10.0 | 10.0 | 12.0 |
| (F3) | Surfactant (HLB = 14.9) | 0.8 | 0.8 | 0.8 |
| (F3) | Bacon Flavorings | 10.15 | 10.15 | 5.0 |
| (S1) | Guar Gum | 0.105 | 0.105 | 0.105 |
| (S1) | Locust Bean Gum | 0.105 | 0.105 | 0.105 |
| (S1) | Soy Proteinate | 0.421 | 0.421 | 0.421 |
| (S1) | Salt | 0.421 | 0.421 | 0.421 |
| (S2) | Water | 9.999 | 9.999 | 9.999 |
| (S3) | Corn Oil | 9.999 | 9.999 | 9.999 |
|  | Spun Soy Fibers | 12.0 | 12.0 | 13.25 |
|  | Collagen Fibers | 12.0 | 12.0 | 13.25 |
|  |  | 100.000 | 100.000 | 100.000 |

Procedure A

A first emulsion system (F) was prepared as follows for each dough, i.e., dark red lean, light red lean, and fatty, using the designated ingredients and proportions F1 through F3 listed in Table I.

Step 1—Ingredients labeled (F1) were mixed in a Hobart Model CM mixer fitted with a paddle.

Step 2—A water mix of ingredients labeled (F2) at a temperature of about 110° F. to about 135° F. was then mixed with Step 1 ingredients at maximum RPM of the mixer until a smooth paste was formed.

Step 3—An oil mix of ingredients labeled (F3) at a temperature of about 110° F. to about 135° F. was then slowly added to the mixer while mixing at maximum RPM to form the first emulsion system.

A second emulsion system (S) was prepared as follows for each dough, i.e., dark red lean, light red lean, and fatty, using the designated ingredients and proportions S1 through S3 listed in Table I.

Procedure B

Step 1—Ingredients labeled (S1) were mixed in a Hobart Mixer Model CM fitted with a paddle.

Step 2—Ingredients labeled (S2) was placed in a Hobart Mixer Model VCM at room temperature.

Step 3—The mix from Step 1 was then slowly added to Step 2 ingredient in the Hobart Mixer Model VCM while mixing at maximum RPM until a smooth preparation was formed.

Step 4—Ingredient labeled (S3) was then slowly admixed in the VCM mixer at low to medium RPM to form a stable second emulsion system.

Procedure C

Second emulsion system (S) from Procedure B was then admixed with first emulsion system (F) from Procedure A for each dough, i.e. dark red lean, light red lean, and fatty, in the proportions listed in Table I, by mixing at low to medium RPM in a model VCM Hobart Mixer to produce a dough.

Procedure D

Spun soy fibers and collagen fibers were added to the dark red lean dough in the amounts and proportions indicated in Table I and mixed at medium RPM until a smooth cohesive final dough was formed.

Spun soy fibers and collagen fibers were added to the light red lean dough in the amounts and proportions indicated in Table I and mixed at medium RPM until a smooth cohesive final dough was formed.

Spun soy fibers and collagen fibers were added to the fatty dough in the amounts and proportions indicated in Table I and mixed at medium RPM until a smooth cohesive final dough was formed.

The doughs were then processed by a continuous extrusion process. The continuous system consisted of four double auger screw feeders each fitted with a dough hopper. The first hopper contained dark red lean dough, the second and fourth hoppers contained fatty dough, and the third hopper contained light red lean dough. The screw feeders passed the respective doughs into gear pumps, one gear pump for each feeder, which pumped the separate doughs through a manifold into a transition chamber which was open only at the entrance or manifold end and at the discharge or die end. The doughs were kept separated through the transition chamber by means of three metal dividers. The two outer dividers were pivoted at the entrance end and were movable transverse to the direction of extrusion by means of divider controls at the die end. During extrusion the moveable dividers were oscillated separately and in unison and thereby imparted a bacon-like marbling by varying the width of the substrips and also imparted a crinkle and curl to the common strip. From the transition zone the dough passed through the die. The die consisted of a tapered entrance zone which funneled the dough into a rectangular non-tapered land zone and opening. The dividers terminated in the tapered zone of the die thereby permitting the substrips of dough to meld together in the tapered zone and in the die land, thereby forming a common strip containing 4 substrips of variable widths. The opening of the die was 2.54 cm long and 0.15 cm wide.

The extruded strip of marbled, crinkled and curled simulated bacon was deposited on a continuous belt which had a speed slightly lower than the speed of the extruded strip, thereby causing the extruded strip to become folded, twisted, and curled as it was deposited on the moving continuous belt. The continuous belt transported the strip of simulated bacon containing crinkles, curls, twists, and folds, through a microwave oven, Cryodry model 1-5 LC equipped with a Cryodry model 2LP applicator and power generator control operated at 2000 to 2500 watts and a continuous belt speed of 5 to 8 feet per minute whereby the strip was heat set by a temperature of about 150° to about 190° F. for about 20 to 40 seconds. The strip was then discharged and cut into bacon slice lengths, cooled to room temperature, packed in cartons, and stored in a food freezer.

The stored strips were removed from the freezer and placed in a single layer in an unheated frying pan and the pan was heated to about 350° F. whereby during frying the strips self-basted by rendering out oil in a manner similar to natural fried bacon. The fried product simulated natural bacon in frying properties, appearance, aroma, flavor, and texture, including crinkle and curl.

EXAMPLE II

In accordance with the invention, a simulated bacon which incorporates the features of bacon-like marbling, crinkling, self-basting, and texture contrast between the simulated lean and simulated fatty, was prepared by a continuous extrusion process according to the method of Example I and the formula in Table II.

TABLE II

| | | Dark Red Lean | Light Red Lean | Fatty |
|---|---|---|---|---|
| (F1) | Egg Albumen | 3.0 | 3.0 | 3.0 |
| (F1) | Soy Proteinate | 4.0 | 4.0 | 4.0 |
| (F1) | Pregelatinized Tapioca Starch | 2.0 | 2.0 | 2.0 |
| (F1) | Guar Gum | 2.0 | 2.0 | 2.5 |
| (F1) | Colorants | 0.164 | 0.082 | 0.001 |
| (F1) | Vitamin Premix | 0.04 | 0.04 | 0.04 |
| (F2) | Water | 22.796 | 22.878 | 23.084 |
| (F2) | Caramel Color | — | — | 0.025 |
| (F2) | Sorbitol 70% Solution | 6.0 | 6.0 | — |
| (F3) | Corn Oil | 10.0 | 10.0 | 12.0 |
| (F3) | Surfactant (HBL = 14.9) | 0.8 | 0.8 | 0.8 |
| (F3) | Bacon Flavorings | 10.15 | 10.15 | 5.0 |
| (S1) | Guar Gum | 0.105 | 0.105 | 0.105 |
| (S1) | Locust Bean Gum | 0.105 | 0.105 | 0.105 |
| (S1) | Soy Proteinate | 0.421 | 0.421 | 0.421 |
| (S1) | Salt | 0.421 | 0.421 | 0.421 |
| (S2) | Water | 9.999 | 9.999 | 9.999 |
| | Spun Soy Fibers | 6.0 | 6.0 | 13.25 |
| | Collagen Fibers | 12.0 | 12.0 | 13.25 |

TABLE II-continued

| | Dark Red Lean | Light Red Lean | Fatty |
|---|---|---|---|
| | 100.000 | 100.000 | 100.000 |

The texture contrast between lean and fatty simulated portions of the fried strip was enhanced by the method of Example II.

EXAMPLE III

A simulated bacon which incorporates the features of bacon-like marbling, crinkling, self-basting, texture contrast between the simulated lean and fat portion, and which comprised a continuously varied strip width, was made by a continuous extrusion process according to the following method:

The formula and method of Example 2 was followed and supplemented by a means of varying the strip width by use of a die having a discharge opening about 3.81 cm long and 0.15 cm wide. The discharge face of the die was fitted with moveable metal slides that blocked the die opening length to provide a minimum opening of 1.9 cm to a maximum of 3.8 cm. The moveable slides were varied singly and in combination during continuous extrusion and thereby randomly varied the width of the extruded strip over the range 1.9 to 3.8 cm. The uncooked and fried strips were found to have superior bacon-like appearance.

Although the description of this invention has included considerable detail, the particularity is not intended to limit the scope except as defined in the appended claims.

Therefore I claim:

1. A process for the production of a bacon analogue having self basting characteristics, resembling natural bacon in appearance, cooking characteristics, flavor, eating qualities, and texture, said process comprising:
   a. preparing a first emulsion system to simulate the dark red lean portion of natural bacon, by admixing from 2–7 percent by weight heat setting protein, from 0–5 percent by weight of a protein additive selected from the group consisting of soy protein isolates, soy proteinates, peanut protein isolate, peanut proteinate, cottonseed protein isolate, and cottonseed proteinate, from 0.5–4 percent by weight starch, from 0.5–6 percent by weight vegetable gum, vitamins, coloring agents, flavoring agents, from 0.4–1.5 percent by weight surfactant, from 15–30 percent by weight water, and from 4–18 percent by weight oil or fat;
   b. preparing a first emulsion system to simulate the light red lean portion of natural bacon by admixing from 2–7 percent by weight heat setting protein, from 0–5 percent by weight of a protein additive, from 0.5–4 percent by weight starch, from 0.5–6 percent by weight vegetable gum, vitamins, coloring agents, flavoring agents, from 0.4–1.5 percent by weight surfactant, from 15–30 percent by weight water, and from 4–18 percent by weight oil or fat;
   c. preparing a first emulsion system to simulate the fatty portion of natural bacon, by admixing from 2–7 percent by weight heat setting protein, from 0–5 percent by weight of a protein additive, from 0.5–4 percent by weight starch, from 0.5–6 percent by weight vegetable gum, vitamins, coloring agents, flavoring agents, from 0.4–1.5 percent by weight surfactant, from 15–30 percent by weight water and from 4–18 percent by weight oil or fat;
   d. preparing a second emulsion system by admixing from 0.1 to 1.0 percent by weight of a protein additive, flavoring agents, from 0.05–1 percent by weight vegetable gums, from 5–15 percent by weight water, and from 5–15 percent by weight oil or fat;
   e. separately admixing the second emulsion system with each of the three differently colored first emulsion systems to produce a separate and distinct first dough, a separate and distinct second dough, and a separate and distinct third dough, said first dough resembling the dark red lean portion of natural bacon, said second dough resembling the light red lean portion of natural bacon, said third dough resembling the fatty portion of natural bacon;
   f. admixing from 15–30 percent by weight of protein fibers with each of the first, second, and third doughs, said protein fibers ranging in length from 0.6–5 centimeters;
   g. simultaneously and separately extruding each of the first, second, and third doughs through a common die to form a single strip that is marbled like bacon whereby the single strip is composed of alternating substrips of the first, second, and third doughs, such that a first outer border substrip, of the first dough, is adjacent and generally parallel to a next substrip of the second dough which is adjacent and generally parallel to a substrip of the third dough which is adjacent and generally parallel to a second outer border substrip, of the second dough, wherein all four substrips are oriented in parallel fashion to each other and to the longitudinal axis of the extruded single strip;
   h. heating the single common strip which resembles marbled bacon; and
   i. cutting the single common strip to simulate bacon slices.

2. A process as in claim 1 wherein the ratio of the first emulsion system to the second emulsion system in paragraph (e) is within the range of 1:1 to 3.5:1.0.

3. A process as in claim 1 wherein the ratio of the first emulsion system to the second emulsion system in paragraph (e) is within the range of 1:1 to 2.6:1.

4. A process as in claim 1 wherein the heat setting protein is selected from the group consisting of egg albumen, soybean oil meal, soybean flour, soy protein concentrate, soy protein isolates, yeast, cottonseed meal cottonseed flour, cottonseed protein isolate, peanut meal, peanut flour, peanut protein isolate, corn germ, corn germ meal, wheat germ, wheat germ meal and wheat gluten.

5. A process as in claim 1 wherein the oil or fat is selected from the group consisting of corn oil, rendered fried bacon fat, lard, cottonseed oil, safflower oil, coconut oil, and peanut oil.

6. A process as in claim 1 wherein the vegetable gum is selected from the group consisting of guar gum, seaweed extract, carrageenan, locust bean gum and methylcellulose.

7. A process as in claim 1 wherein the surfactant has an HLB value in the range 1 to 20 HLB.

8. A process as in claim 1 wherein the single strip has dimensions similar to a slab of bacon.

9. A process as in claim 1 wherein the single strip has dimensions similar to a slice of bacon.

10. A process as in claim 1 wherein one or more of the substrips are extruded at different rates while forming the single strip in order to produce curling and crinkling similar to that of fried bacon.

11. A process as in claim 1, wherein the single strip of step h. is heated to a temperature between 150° F. and 190° F.

* * * * *